United States Patent
Welch et al.

(10) Patent No.: US 8,941,502 B2
(45) Date of Patent: Jan. 27, 2015

(54) CATENARY SAFETY MONITORING SYSTEM AND METHOD

(75) Inventors: Grant Welch, Goldsbozo, NC (US); Gary Graham, Lewisville, NC (US)

(73) Assignee: Impulse Inc. LLC, Mount Olive, NC (US)

( * ) Notice: Subject to any disclaimer, the term of this patent is extended or adjusted under 35 U.S.C. 154(b) by 675 days.

(21) Appl. No.: 13/284,460

(22) Filed: Oct. 28, 2011

(65) Prior Publication Data

US 2012/0319850 A1  Dec. 20, 2012

Related U.S. Application Data (60) Provisional application No. 61/498,267, filed on Jun. 17, 2011.

(51) Int. Cl.
*G08B 17/00* (2006.01)
*B60M 1/26* (2006.01)

(52) U.S. Cl.
CPC ..................................... *B60M 1/26* (2013.01)
USPC ........... 340/584; 340/581; 340/668; 340/685; 702/130; 73/862.391

(58) Field of Classification Search
None
See application file for complete search history.

(56) References Cited

U.S. PATENT DOCUMENTS

| | | |
|---|---|---|
| 4,158,962 A | 6/1979 | Conoval |
| 4,402,229 A | 9/1983 | Byrne |
| 4,458,880 A | 7/1984 | Conti |
| 4,492,363 A | 1/1985 | Niskin |
| 4,565,099 A | 1/1986 | Arnold |
| 4,686,325 A | 8/1987 | Marsico et al. |
| 4,691,113 A | 9/1987 | Corvazier et al. |
| 4,875,295 A | 10/1989 | Fleckenstein |
| 4,928,538 A | 5/1990 | Burdess et al. |
| 5,103,937 A | 4/1992 | Robertson |
| 5,235,861 A | 8/1993 | Seppa |

(Continued)

FOREIGN PATENT DOCUMENTS

| | | |
|---|---|---|
| GB | 702334 | 1/1954 |
| JP | 2009074991 | 4/2010 |
| WO | WO 2010127145 | 11/2010 |

OTHER PUBLICATIONS

Mounting and Magnets (for Sensor Models RH, GH and GT); taken from the Internet on Apr. 6, 2011 from http://www.mtssensors.com/fileadmin/media/pdfs/MountingandMagnets.pdf.

(Continued)

*Primary Examiner* — Curtis King
(74) *Attorney, Agent, or Firm* — R. Blake Johnston; DLA Piper LLP (US)

(57) ABSTRACT

A safety monitoring system for a catenary system that includes an overhead wire, a support pole and a counterweight attached to the end of the overhead wire and suspended by the support pole. The catenary safety monitoring system includes a temperature sensor for detecting an ambient temperature, a position sensor for detecting a position of the counterweight and an electronic controller. The electronic controller compares a detected position of the counterweight with a predicted position determined by the electronic controller using an ambient temperature from the temperature sensor. A message transmitter provides a warning to a user if the detected position of counterweight is not within a predetermined percentage of the predicted position.

27 Claims, 5 Drawing Sheets

(56) References Cited

U.S. PATENT DOCUMENTS

| | | |
|---|---|---|
| 6,097,298 A | 8/2000 | Brown |
| 6,205,867 B1 | 3/2001 | Hayes et al. |
| 6,205,868 B1 | 3/2001 | Miller |
| 6,670,806 B2 | 12/2003 | Wendt et al. |
| 7,478,563 B2 | 1/2009 | Weisman |
| 7,578,373 B2 | 8/2009 | Shiratsuki et al. |
| 2009/0015239 A1 | 1/2009 | Georgiou et al. |
| 2009/0138229 A1* | 5/2009 | Engelhardt et al. ........... 702/130 |
| 2012/0046799 A1* | 2/2012 | Alex et al. .................... 700/298 |
| 2013/0060520 A1* | 3/2013 | Amor et al. ................... 702/154 |

OTHER PUBLICATIONS

Office Action from corresponding Mexican Office Action from Mexican Patent Application No. MX/a/2011/13012 dated Aug. 15, 2014.

English Translation of corresponding Mexican Office Action from Mexican Patent Application No. MX/a/2011/13012 dated Aug. 15, 2014.

English Translation of JP 2009074991 published Apr. 9, 2010.

* cited by examiner

ND METHOD

CLAIM OF PRIORITY

This application claims priority to provisional patent application No. 61/498,267, filed Jun. 17, 2011, currently pending.

FIELD OF THE INVENTION

The present invention relates to catenary or overhead contact systems of the type used in electrified transit systems and, more particularly, to a catenary safety monitoring system and method for such catenary systems.

BACKGROUND OF THE INVENTION

Overhead contact systems, also called catenary systems, have been in use since the 19th century to provide the electrical energy needed to power transit vehicles, such as streetcars, light rail trains and high speed rail trains.

In a typical catenary system, there are two main wires that conduct the electrical power: the messenger wire and the contact wire. The messenger wire serves as the main electrical conductor and supports the contact wire below. The contact wire transfers the electrical power to the motors on the transit vehicle through a current collector, such as a pantograph, typically mounted on the top of the vehicle. The messenger and contact wires are supported by support structures typically placed at 150 foot intervals along the transit system tracks, with the wire run ends approximately 3000 feet in total distance.

Catenary systems have specific requirements for safety and protection of vital system components. These include conformance of the messenger and contact wires to specific geometries to achieve the high speed power collection requirements of transit vehicles.

A key part of catenary systems is maintaining constant tension on the messenger and contact wires as the wires expand and contract as a result of ambient temperature changes. Such tension control is commonly accomplished through use of a constant tensioning system featuring pulleys and a counterweight that moves up and down to counter changes in messenger and contact wire lengths as they stretch (expand) and contract.

Figure 1:
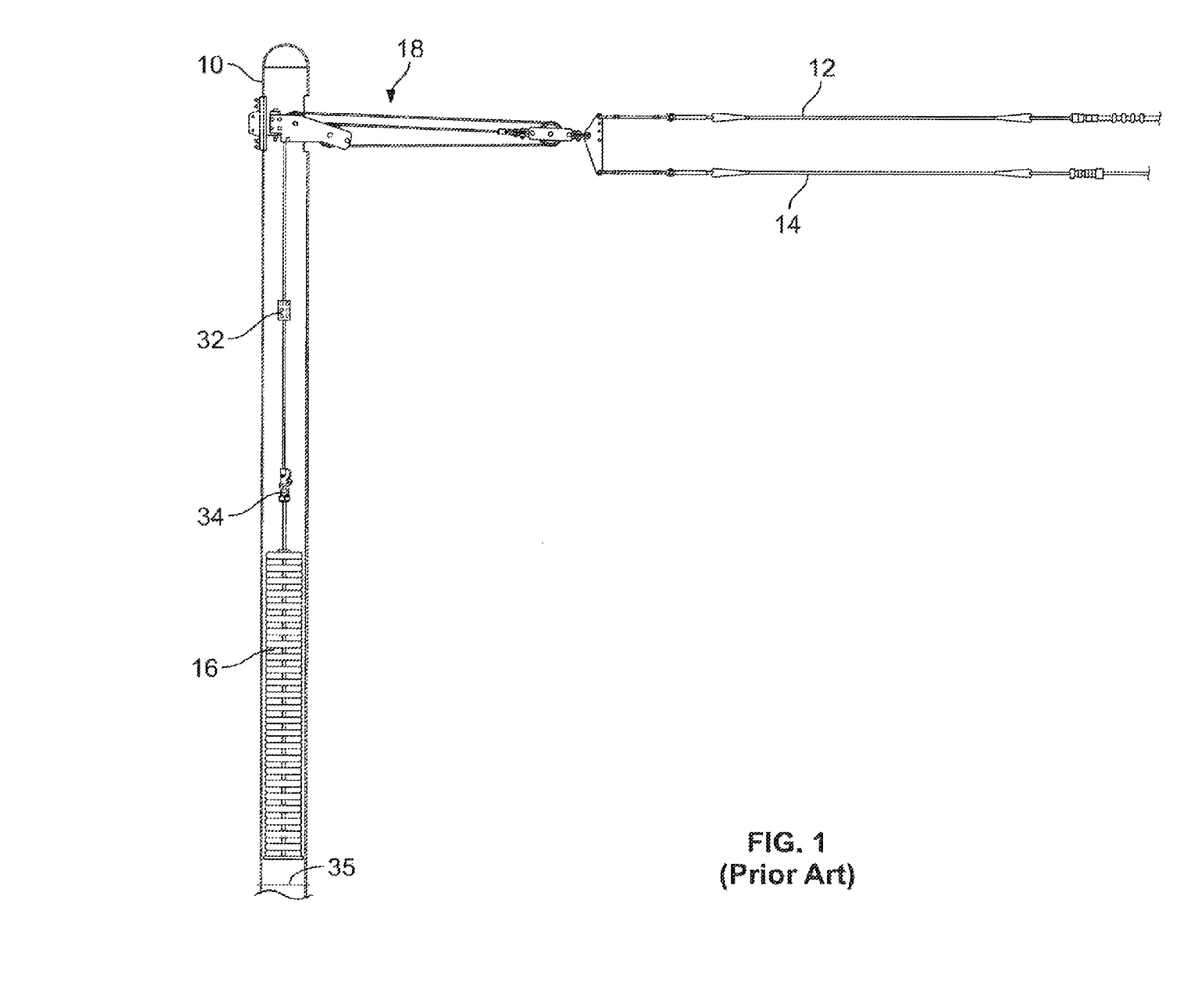
FIG. 1 is a side elevation, partly cutaway view of a support pole of a catenary system provided with a prior art constant tensioning system.
Figure 2:
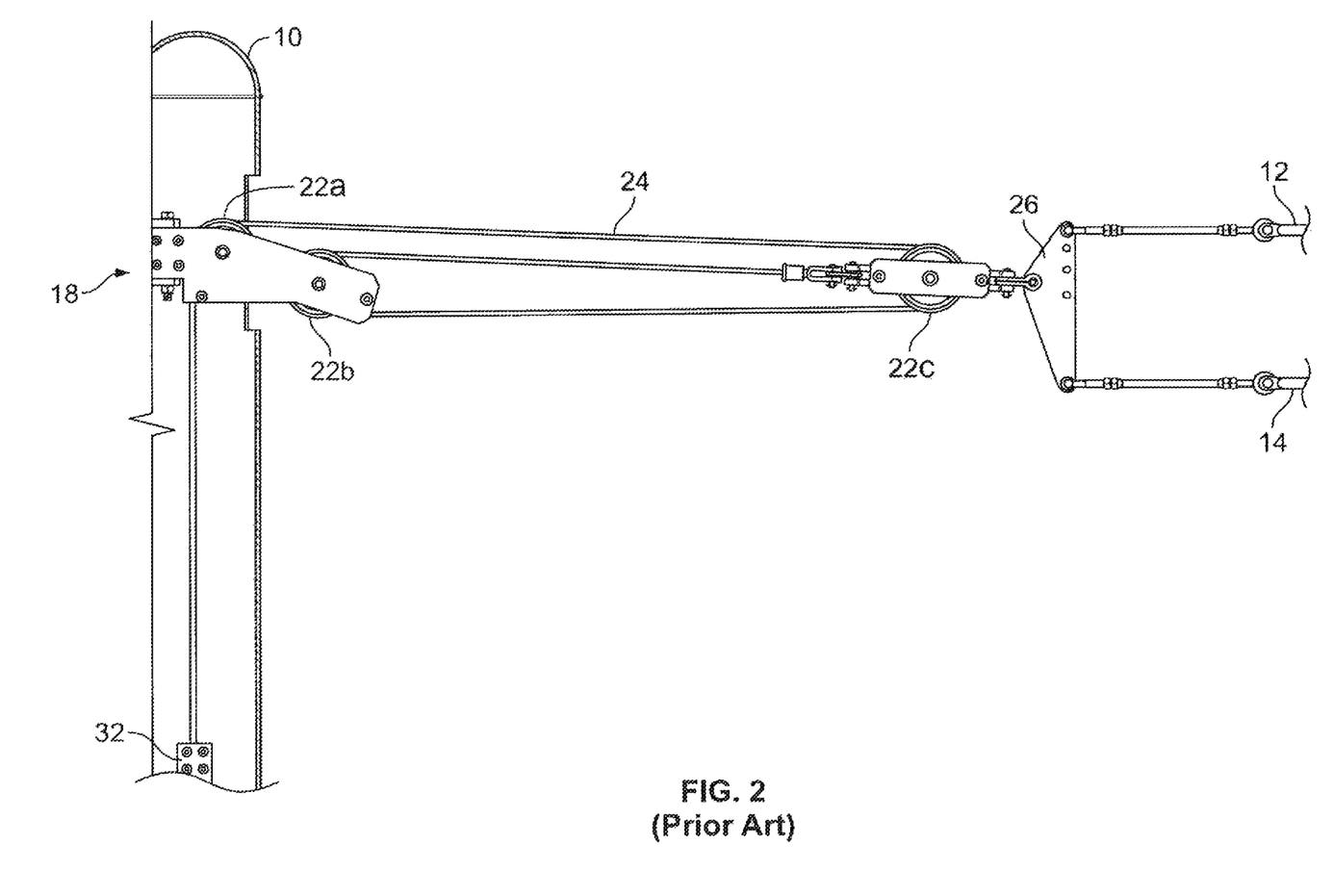
FIG. 2 is an enlarged view of the counterweight pulley assembly of the constant tensioning system of FIG. 2.

A typical prior art constant tensioning system is illustrated in FIGS. 1 and 2. As illustrated in FIG. 1 and described above, a pole 10 supports messenger wire 12 and contact wire 14 at one end, the opposite ends of which are attached in a fixed fashion to a neighboring support pole (as noted above, typically around 3000 feet away). The support pole 10 is hollow and houses a counterweight 16, which is typically a stack of weights, that is suspended and attached to the ends of the messenger wire 12 and contact wire 14 by a counterweight pulley assembly, indicated in general at 18.

As illustrated in FIG. 2, the counterweight pulley assembly 18 uses three pulleys 22a, 22b and 22c, a pulley assembly wire 24 and a yoke plate 26 to control the tension in both the messenger and contact wires. The three pulleys create a three to one ratio on the yoke plate. As a result, however much counterweight there is, three times that, force will be applied to the yoke plate. As illustrated in FIG. 2, the yoke plate has the force applied closer to the messenger wire 12 than the contact wire 14. This offset allows the messenger wire to stay in a higher constant tension with respect to the contact wire. As is known in the art, some constant tensioning systems have different pulley ratios, some have the weights outside the pole, some use H-Beams, I-Beams, etc., but they all typically operate in the same fashion.

In operation, as noted previously, the counterweight 16 of FIG. 1 moves up and down to maintain constant tension in the messenger and contact wires depending on ambient temperature. A cold stop at the upper top limit of counterweight travel is provided by bracket 32, when engaged by counterweight connector 34 (FIG. 1), and a hot stop is provided at the lower bottom limit of counterweight travel by plate 35. As is known in the art, alternative cold and hot stop arrangements may be used.

As with any mechanical device or system, constant tensioning systems can malfunction. Furthermore, obstructions, such as ice or falling tree branches, can occur along the catenary systems between the support poles. This may cause the wires of the catenary system to sag down to an unsafe level.

Furthermore, if the messenger wire and/or the contact wire breaks, live wires could fall to the ground creating a safety hazard. While there are electrical breakers that will typically trip when a ground fault is detected, a live wire could possibly fall without tripping the breaker.

Issues such as those described above are typically determined via visual inspection. Such an approach is time intensive and wasteful of resources. As a result, such inspections may not be performed due to shortage of personal or budget limitations. Such inspections also rely upon the perception and experience level of the individual surveying the catenary and constant tensioning systems. As a result, the accuracy of such an approach may be inconsistent. A better system and approach is needed.

DETAILED DESCRIPTION OF EMBODIMENTS

Figure 3:
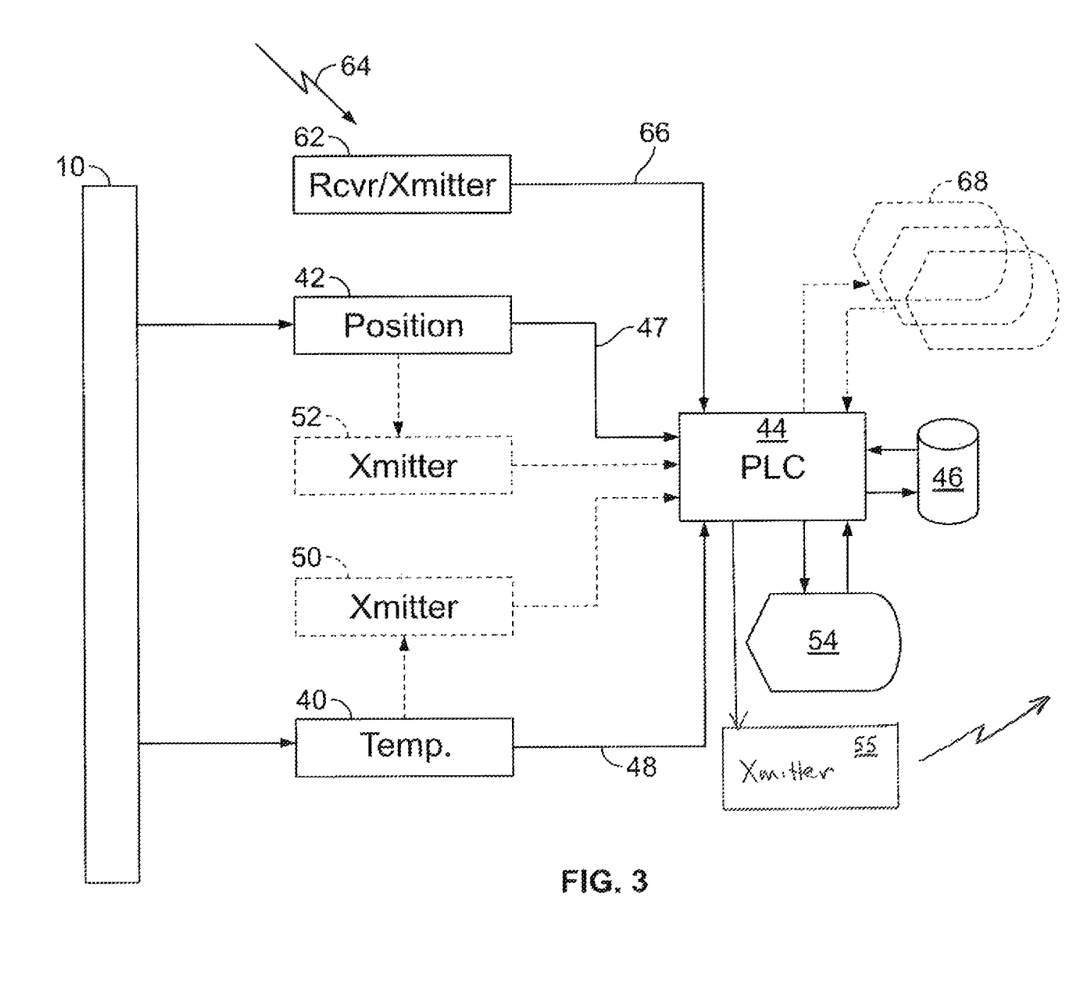
FIG. 3 is a block diagram illustrating the components of an embodiment of the catenary safety monitoring system of the invention.

The catenary safety monitoring system of the invention detects and predicts movement of the messenger wire and contact wire in association with ambient temperature changes. With reference to FIG. 3, there are three main components that make up the catenary safety monitoring system: a sensor 40 to monitor the ambient temperature of the messenger wire and contact wire, a sensor 42 to monitor the position or displacement of the counterweight of the support pole 10, and an electronic controller, preferably in the form of a programmable logic controller (PLC) 44, to receive the inputs from the temperature sensor 40 and position sensor 42 and perform comparisons of the two signals. Suitable PLCs are available from, as examples only, Schneider Electric (Modicon brand PLCs) of Rueil-Malmaison, France; Rockwell Automation (Allen Bradley brand PLCs) of Milwaukee, Wis. and Siemens AG of Munich, Germany.

In addition, the system preferably includes a data storage device in the form of a database 46 to store a formula for predicting the position of the counterweight based on a detected outdoor or ambient temperature or ambient temperature and counterweight position data in accordance with embodiments of the system and method of the present invention.

The PLC 44 may be located locally with the support pole 10 and constant tensioning system or at a remote facility that that may receive data from a number of systems of the type illustrated in FIG. 3. The position sensor 42 and temperature sensor 40 may communicate with the PLC 44 via a wire connection, as indicated by lines 47 and 48, respectively, in FIG. 3, or by wireless transmission via transmitters 50 and 52. The transmitters may be separate components, as illustrated in phantom in FIG. 3, or they may be incorporated into the temperature sensor and position sensor.

As illustrated in FIG. 3, the system also preferably includes a user display 54 that communicates with the PLC 44. The user display may take the form of a computer workstation or a simple display panel or even simply a warning indicator (which could be visual and/or auditory) or numerous other types of displays, gauges or readouts. The display may also be used to access a printer to produce data reports and the like.

As an alternative, or in addition to, the display 54, a message transmitter 55 may be in communication with the PLC 44 and may be configured to send a message, such as by text or email or some other form of wireless transmission, to a maintenance worker warning that there is an issue with the catenary system, as described below.

The system may optionally include a receiver 62 that receives transmissions 64 (for example, by RF transmission or cell technology) regarding weather forecasts for the area of the catenary system. The use of this data will be explained in greater detail below. The weather forecast receiver 62 may communicate with the PLC via a wire connection or may also function as a transmitter so as to communicate with the PLC by wireless transmission (both of which are indicated by line 66). Of course, as transmitter separate from the receiver 62 may also be used to communicate with the PLC 44.

Temperature changes between neighboring constant tensioning systems could be insignificant. As a result, the temperature sensor of FIG. 3 may not have to be installed on each constant tensioning system of a catenary system. Furthermore, the PLC 44 of FIG. 3 could be configured to communicate with a number of remote user displays, illustrated in phantom at 68.

The PLC 44 and other components of FIG. 3 may be powered by any means known in the art including, but not limited to, 120V AC power source, battery, solar and/or DC power from the catenary.

Returning to the temperature sensor 40 and position sensor 42 of FIG. 3, the temperature sensor keeps track of the outside ambient temperature for the catenary system. An example of a suitable temperature transmitter with sensor is the EWSE Series Air Temperature Sensor available from Omega Engineering, Inc. of Stamford, Conn. (www.omega.com). Another example of a suitable temperature sensor is a thermocouple.

An example of operation and use of the temperature sensor is as follows. Using the analog output from the temperature sensor 40 and linearly scaling the 4-20 mA signal from −30° F. to 130° F. (this range being an example only) a relationship is established. More specifically, when the temperature is −30° F., a 4 mA signal is sent to the PLC 44 and when the temperature in 130° F., a 20 mA signal is sent to the PLC. The PLC is then able to interpolate between these upper and lower temperatures. Typically available temperature sensors are capable of accuracies within 0.25° F.

Figure 4:
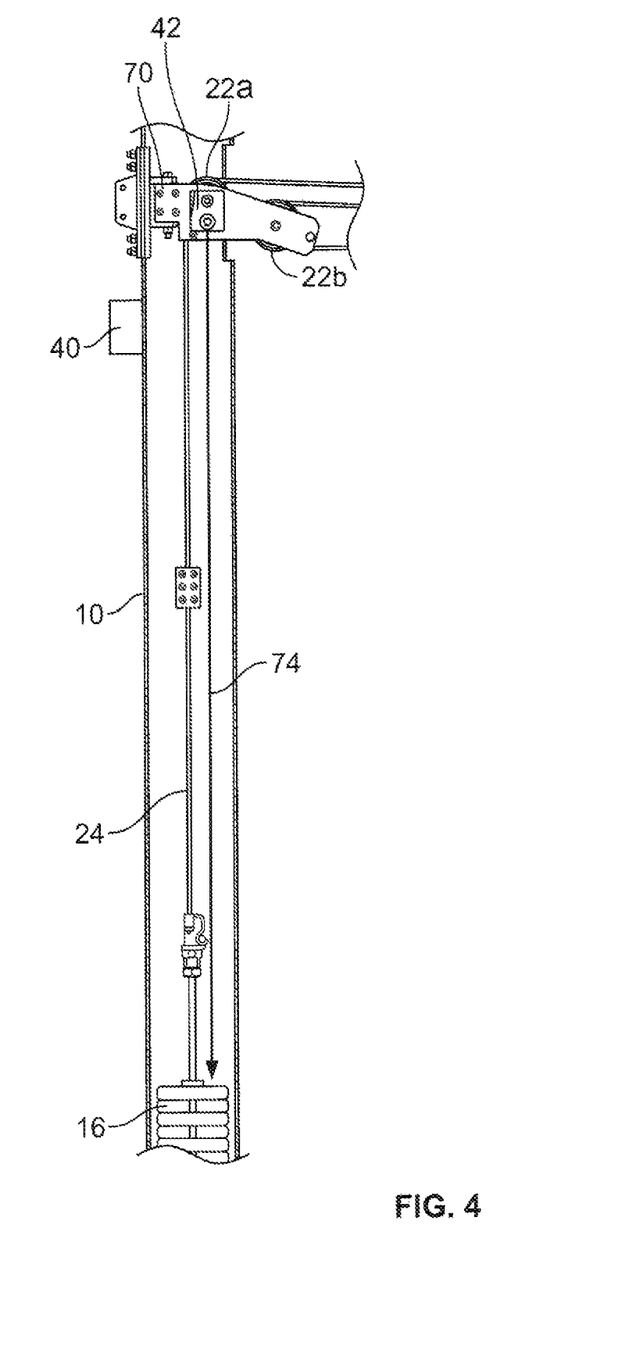
FIG. 4 is a side elevation view of a catenary system support pole and constant tensioning system provided with a sensor and temperature sensor in accordance with an embodiment of the present invention.

The temperature sensor 40 could be mounted anywhere in the vicinity of the constant tensioning system, or even on the wire 24. As illustrated in FIG. 4, however, it is preferable to mount the sensor 40 high off of the ground on the support pole 10 to prevent vandalism, tampering or snow build up. The temperature sensor may be mounted using screws, nuts and bolts or could be attached using magnets if quick and easy installation was desired. Other known attachment arrangements, both permanent and temporary, may be used.

In addition to the temperature provided by sensor 40, the position of the counterweight of the constant tensioning system is the second input needed by the PLC 44 for proper function of the catenary safety monitoring system of FIG. 3. The vertical position of the counterweight stack (16 in FIGS. 1 and 4) is preferably measured using a commercially available magnetostrictive linear-position sensor, such as the Temposonics Model MH sensor available from MTS Systems Corporation, Sensors Division, of Cary, N.C. (www.mtssensors.com). As another example, the vertical position of the counterweight stack may be measured using a commercially available string potentiometer. An example of a suitable string potentiometer is the model SR1M Industrial Low Cost String Pot available from Celesco Transducer Products, Inc. of Chatsworth, Calif. (www. celesco.com).

The position sensor 42 (of FIG. 3) may be mounted in the vicinity of the pulley assembly wire 24, such as along side of the pulleys, or even on the wire 24. If the position sensor 42 is a string potentiometer, as illustrated in FIG. 4, it may be mounted to the outside plate 70 of the first pulley 22*a* and the string 74 of the string potentiometer is attached to the top of the counter weight stack 16, or vice versa. The string potentiometer may have, for example, an analog output of 4-20 mA and be linearly scaled against where the weights are positioned at the top and bottom (or cold and hot) stops. The string potentiometers typically are accurate to within 0.5 inches. Greater accuracies are achieved if a magnetostrictive linear-position sensor is used as the position sensor 42.

The position sensor 42 may be mounted using screws, nuts and bolts or could be attached using magnets if quick and easy installation was desired. Other known attachment arrangements, both permanent and temporary, may be used.

The operation of PLC 44 of FIG. 3 will now be explained.

The bronze and/or copper alloy of the messenger and contact wires (12 and 14 in FIG. 1) has a constant thermal expansion value. This constant value means that a proportional relationship exists between the position of the counterweight and the outside temperature. The formula for this relationship is entered into and stored in the database 46 of FIG. 3. By comparing the detected position of the counterweight (at the detected outside temperature) with a predicted counterweight position calculated using the detected outside temperature and the formula in the database, the PLC of the system can determine if the counterweight is in the correct position for the corresponding temperature. If the counterweight is out of position with respect to the actual temperature, the PLC is able to determine the exact out-of-position measurement and is also able to send a message or an alarm to alert the user via message transmitter 55 and/or display 54 that a non-standard situation exists and maintenance or other corrective action is necessary on the catenary system. As an alternative to a formula, a table of outside temperatures and corresponding counterweight positions could be stored in the database 46 and used in the comparison.

Figure 5:
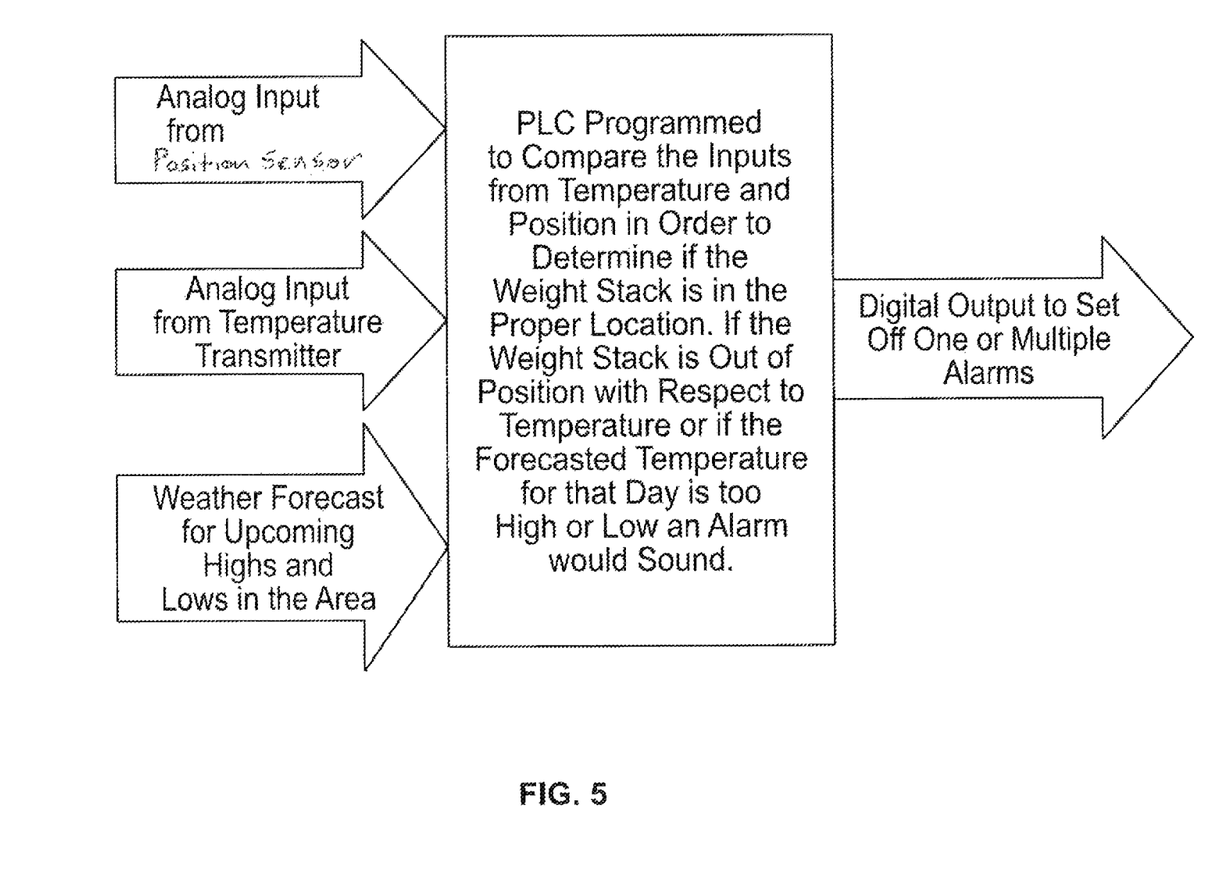
FIG. 5 is a flow chart illustrating the processing of the electronic controller of the catenary safety monitoring system of FIGS. 4 and 5.

Examples of issues that could cause the counterweight to be out of standard position with respect to ambient temperature include, but are not limited to, the following:
1. Counterweight hits cold stop
2. Counterweight hits hot stop
3. Tree or other object falls on the wires
4. Sudden failure of either the contact or messenger wire
5. Ice build up
6. Wire creep
7. Sticky counterweight pulley
8. Severe wind or other vibrations A basic flow chart as to how the PLC takes data from the temperature sensor and the position sensor to activate alarms is illustrated in FIG. 5. As an example, where the messenger and contact wires are copper, the rate of thermal expansion of copper is constant at 0.0000094 in/° F., so that a relationship for the particular catenary system can be established. A formula is programmed into the PLC where two of the variables are data obtained from the position sensor ("Counterweight Displacement") and the temperature sensor ("Input Temp"). In accordance with an embodiment of the method of the invention, a baseline or set point is established using the length of the messenger and contact wires, which are assumed to be the same length, on an average day, for example at 70° F. In such a situation, the PLC may be programmed with the following formula:

$$\text{Counterweight Displacement} = 3 \ast [(\text{Input\_Temp} - (70°\text{ F.})) \ast (\text{Length of Wire in Inches at } 70°\text{ F.}) \ast (0.0000094 \text{ in/in }°\text{ F.})]$$

The PLC uses the above formula to compute a predicted vertical displacement or position of the constant tensioning system counterweight in inches based on the ambient temperature detected by sensor 40. The above formula uses a multiple of three to account for the use of the three pulleys by the example constant tensioning system (see FIG. 1). As a result, for every one inch the messenger and contact cables move, the counterweight moves three inches. The PLC compares the result from the above formula to the measured counterweight displacement or position number from the position sensor. Figuring in the inaccuracies of the temperature sensor and of the position sensor, the counterweight displacement or position calculated from the above formula should be within a predetermined or specified percentage, such as within about 1% to 5%, of the number from the position sensor. If the displacement or position inputted from the position sensor is not within the predetermined percentage of the displacement or position predicted from the above formula, an alarm or other warning will sound or display to alert the user of an issue with the catenary system.

As noted above, the PLC optionally also obtains daily weather forecast data. Such an embodiment of the catenary safety monitoring system can use the maximum and/or minimum temperatures from weather forecasts to calculate corresponding counterweight positions (such as by using the above formula) and predict if the counterweights will approach or reach the applicable stops. The PLC will transmit a warning to the user in order to take appropriate action before a serious safety issue occurs.

A couple of examples of operation of the above embodiment of the system of the invention are now provided:

Example One: A contact wire or messenger breaks causing a sudden change in position of the counterweight. The PLC detects this sudden change in comparison to temperature and outputs an alarm. Under normal catenary system operation, a broken contact or messenger wire should trip the electrical breaker that provides power to the wires. Depending on the system, an alarm from the electrical breaker may notify the user and or automatically reset the breaker. If the breaker does not trip and no alarm indication is provided to notify the user, there is the likelihood of a live wire situation in close proximity to person or property posing a safety hazard.

Example Two: When the ambient temperature drops below the minimum design temperature for the catenary system, the counterweight will approach the cold stop. Any further decrease in ambient temperature will cause the counterweight to hit the cold stop whereby the tension in the contact and messenger wires will continue to rise quickly. Excessive tension may lead to wire failure (breakage and a serious safety issue). When the ambient temperature is higher than the maximum design temperature for the catenary system, the counterweight will approach the hot stop. As the temperature continues to increase, the counterweight will hit the hot stop causing a decrease in the catenary system tension. When this happens, the contact wires will droop increasing the possibility of the pantograph snagging on the contact wire (a serious safety issue).

The invention thus provides a unique and efficient way to monitor the status and predict safety issues of the wires and cables of a catenary or overhead contact system thereby facilitating preventative maintenance and increasing the safety to the passengers and public who are in close proximity to the electrified wires.

While the preferred embodiments of the invention have been shown and described, it will be apparent to those skilled in the art that changes and modifications may be made therein without departing from the spirit of the invention, the scope of which is defined by the appended claims.

What is claimed is:

1. A catenary safety monitoring system for a catenary system that includes an overhead wire, a support pole supporting an end of the overhead wire and a counterweight attached to the end of the overhead wire and suspended by the support pole, the catenary safety monitoring system comprising:
   a. a temperature sensor for detecting an ambient temperature of the catenary system;
   b. a position sensor for detecting a position of the counterweight;
   c. an electronic controller in communication with the temperature sensor and the position sensor, said electronic controller programmed to compare a position of the counterweight detected with the position sensor with a predicted position of the counterweight determined by the electronic controller using an ambient temperature detected by the temperature sensor; and
   d. a message transmitter in communication with the electronic controller, said electronic controller also programmed to provide a warning message to a user via the message transmitter if the detected position of the counterweight is not within a predetermined percentage of the predicted position.

2. The catenary safety monitoring system of claim 1 further comprising a user display in communication with the electronic controller, said electronic controller also programmed to provide a warning to a user via the user display if the detected position of the counterweight is not within a predetermined percentage of the predicted position.

3. The catenary safety monitoring system of claim 1 wherein the electronic controller uses a formula to calculate the predicted position of the counterweight using the detected ambient temperature.

4. The catenary safety monitoring system of claim 3 further comprising a computer data storage device upon which the formula is stored, said computer data storage device in communication with the electronic controller.

5. The catenary safety monitoring system of claim 1 wherein the electronic controller uses a table of temperature and corresponding counterweight position data to determine the predicted position of the counterweight using the detected ambient temperature.

6. The catenary safety monitoring system of claim 5 further comprising a computer data storage device upon which the table is stored, said computer data storage device in communication with the electronic controller.

7. The catenary safety monitoring system of claim 1 further comprising a weather forecast receiver in communication with the electronic controller, said electronic controller programmed to receive and use maximum and/or minimum temperatures from weather forecasts to determine corresponding predicted counterweight positions.

8. The catenary safety monitoring system of claim 7 further comprising a user display in communication with the electronic controller, said electronic controller also programmed to provide a warning to a user via the user display if the predicted counterweight positions corresponding to the maximum and/or minimum temperatures from the weather forecast are beyond hot and/or cold counterweight stops of the catenary system.

9. The catenary safety monitoring system of claim 1 further comprising at least one transmitter whereby the temperature sensor and/or the position sensor communicate with the electronic controller by wireless transmission.

10. The catenary safety monitoring system of claim 9 wherein the electronic controller is positioned at a remote facility and receives detected ambient and counterweight position data from multiple temperature sensors and position sensors for multiple catenary systems.

11. The catenary safety monitoring system of claim 1 wherein the position sensor is a magnetostrictive linear-position sensor.

12. A catenary system comprising:
a. an overhead wire;
b. a support pole supporting an end of the overhead wire;
c. a counterweight attached to the end of the overhead wire and suspended by the support pole;
d. a temperature sensor for detecting an ambient temperature of the catenary system;
e. a position sensor for detecting a position of the counterweight;
f. an electronic controller in communication with the temperature sensor and the position sensor, said electronic controller programmed to compare a detected position of the counterweight with a predicted position of the counterweight determined using an ambient temperature detected by the temperature sensor; and
g. a message transmitter in communication with the electronic controller, said electronic controller also programmed to provide a warning message to a user via the message transmitter if the detected position of the counterweight is not within a predetermined percentage of the predicted position.

13. The catenary system of claim 12 further comprising a user display in communication with the electronic controller, said electronic controller also programmed to provide a warning to a user via the user display if the detected position of the counterweight is not within a predetermined percentage of the predicted position.

14. The catenary system of claim 12 wherein the electronic controller uses a formula to calculate the predicted position of the counterweight using the detected ambient temperature.

15. The catenary system of claim 14 further comprising a computer data storage device upon which the formula is stored, said computer data storage device in communication with the electronic controller.

16. The catenary system of claim 12 wherein the electronic controller uses a table of temperature and corresponding counterweight position data to determine the predicted position of the counterweight using the detected ambient temperature.

17. The catenary system of claim 16 further comprising a computer data storage device upon which the table is stored, said computer data storage device in communication with the electronic controller.

18. The catenary system of claim 12 further comprising a weather forecast receiver in communication with the electronic controller, said electronic controller programmed to receive and use maximum and/or minimum temperatures from weather forecasts to determine corresponding predicted counterweight positions.

19. The catenary system of claim 18 further comprising a user display in communication with the electronic controller, said electronic controller also programmed to provide a warning to a user via the user display if the predicted counterweight positions corresponding to the maximum and/or minimum temperatures from the weather forecast are beyond hot and/or cold counterweight stops of the catenary system.

20. The catenary system of claim 12 further comprising at least one transmitter whereby the temperature sensor and/or the position sensor communicate with the electronic controller by wireless transmission.

21. The catenary system of claim 20 wherein the electronic controller is positioned at a remote facility and receives detected ambient and counterweight position data from multiple temperature sensors and position sensors for multiple catenary systems.

22. The catenary system of claim 12 wherein the overhead wire is a messenger wire and further comprising a second overhead wire that is a contact wire.

23. The catenary system of claim 22 wherein the messenger wire and the contact wire are attached to the counterweight by a counterweight pulley assembly.

24. The catenary system of claim 12 wherein the temperature sensor and the position sensor are attached to the support pole.

25. A method of monitoring a catenary system that includes an overhead wire, a support pole supporting an end of the overhead wire and a counterweight attached to the end of the overhead wire and suspended by the support pole, the method comprising the steps of:
a. providing a temperature sensor, a position sensor and an electronic controller;
b. detecting an ambient temperature using the temperature sensor;
c. detecting a position of the counterweight using the position sensor;
d. calculating a predicted position of the counterweight using the detected ambient temperature and the electronic controller;
e. comparing the detected position of the counterweight with the predicted position of the counterweight using the electronic controller; and
f. providing a warning if the detected position of the counterweight is not within a predetermined percentage of the predicted position.

26. The method of claim 25 further comprising the steps of:
g. receiving a weather forecast for the catenary system;
h. determining counterweight positions corresponding to the maximum and/or minimum temperatures from the weather forecast.

27. The method of claim 26 further comprising the step of:
i. providing a warning if the counterweight positions corresponding to the maximum and/or minimum temperatures from the weather forecast are beyond hot and/or cold counterweight stops of the catenary system.

\* \* \* \* \*

UNITED STATES PATENT AND TRADEMARK OFFICE
CERTIFICATE OF CORRECTION

| | | |
|---|---|---|
| PATENT NO. | : 8,941,502 B2 | Page 1 of 1 |
| APPLICATION NO. | : 13/284460 | |
| DATED | : January 27, 2015 | |
| INVENTOR(S) | : Grant Welch et al. | |

It is certified that error appears in the above-identified patent and that said Letters Patent is hereby corrected as shown below:

Title Page:

Item (73), replace Assignee "Impulse Inc. LLC" with --IMPulse NC LLC--

Signed and Sealed this
Twentieth Day of October, 2015

Michelle K. Lee
*Director of the United States Patent and Trademark Office*